I. H. SISSON.
MACHINE FOR MAKING HAIRPINS.
APPLICATION FILED NOV. 20, 1915.

1,319,909.

Patented Oct. 28, 1919.
15 SHEETS—SHEET 2.

I. H. SISSON.
MACHINE FOR MAKING HAIRPINS.
APPLICATION FILED NOV. 20, 1915.

1,319,909.

Patented Oct. 28, 1919.
15 SHEETS—SHEET 6.

I. H. SISSON.
MACHINE FOR MAKING HAIRPINS.
APPLICATION FILED NOV. 20, 1915.
1,319,909.
Patented Oct. 28, 1919.
15 SHEETS—SHEET 7.
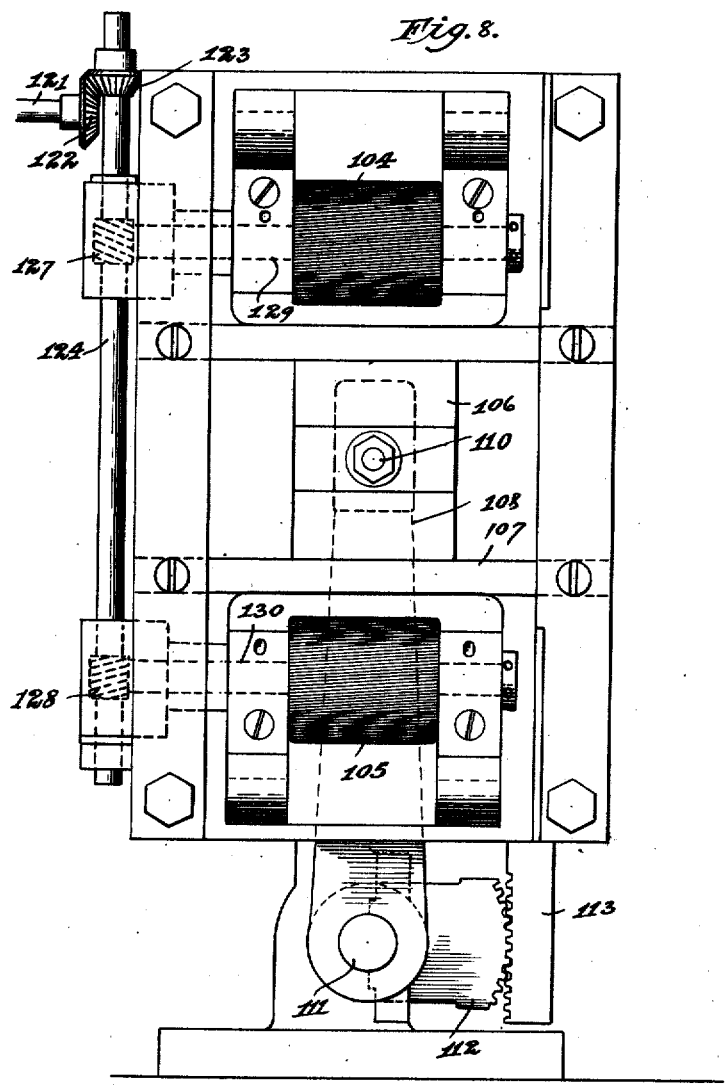
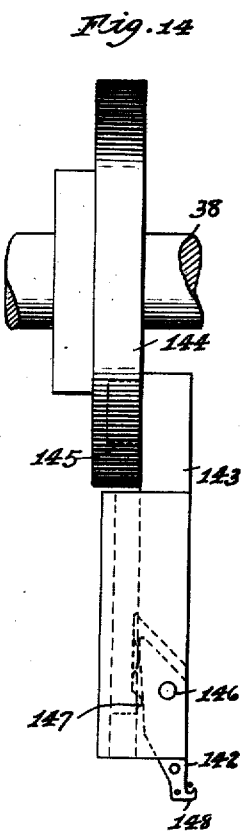
Witness,
S. S. Mann
Inventor.
Isaac Howard Sisson
By Frank L. Belknap Atty.

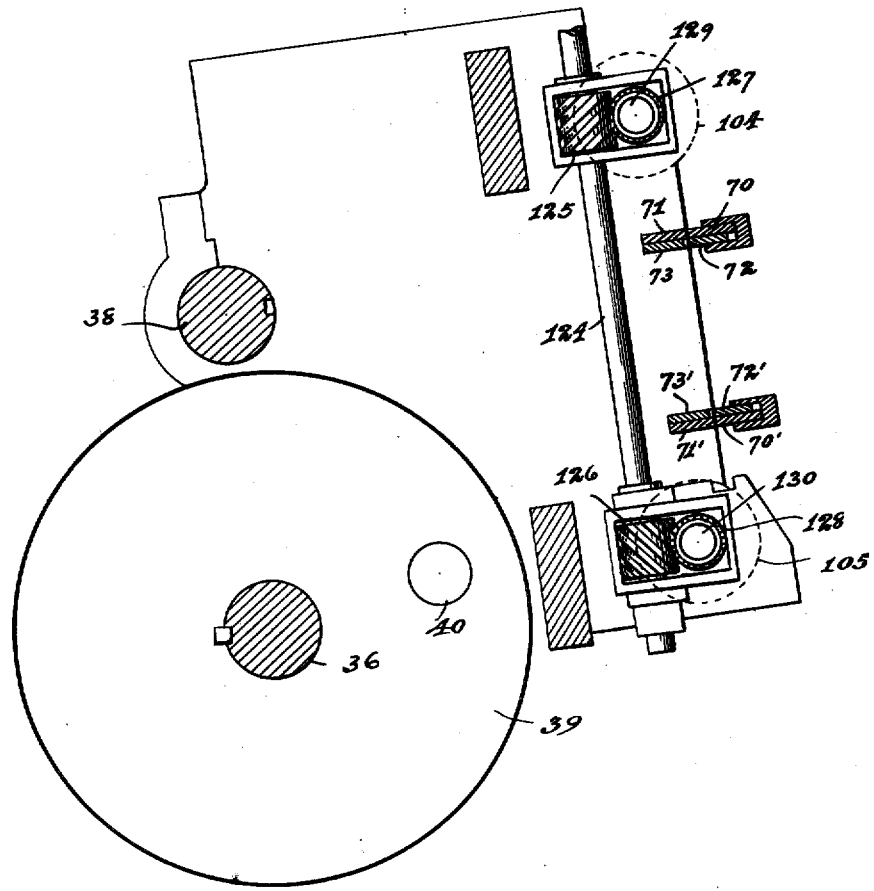

I. H. SISSON.
MACHINE FOR MAKING HAIRPINS.
APPLICATION FILED NOV. 20, 1915.
1,319,909.
Patented Oct. 28, 1919.
15 SHEETS—SHEET 9.
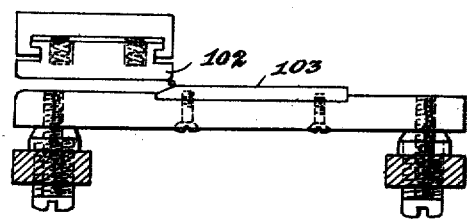
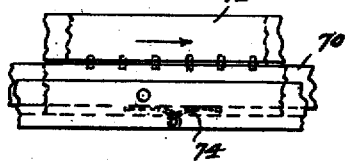
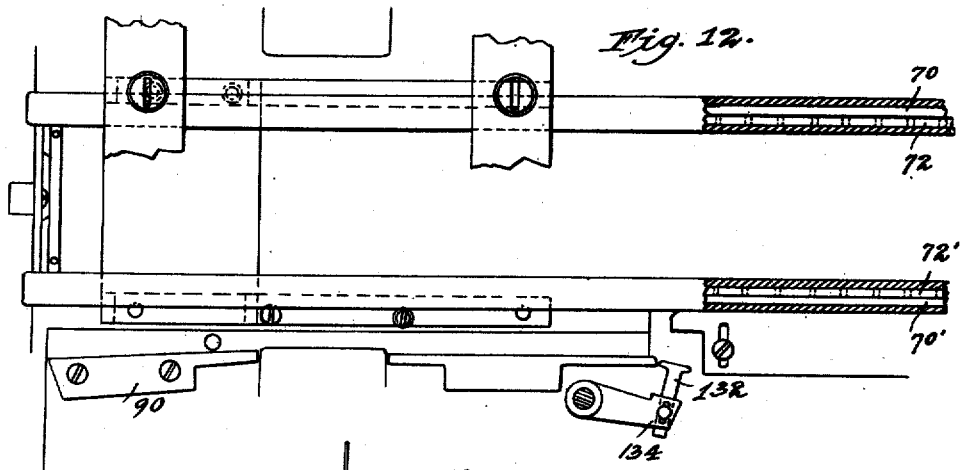
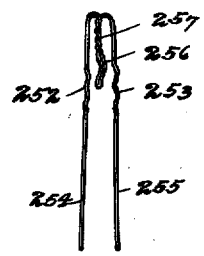
Witness.
Inventor,
Isaac Howard Sisson
Frank L. Belknap
By

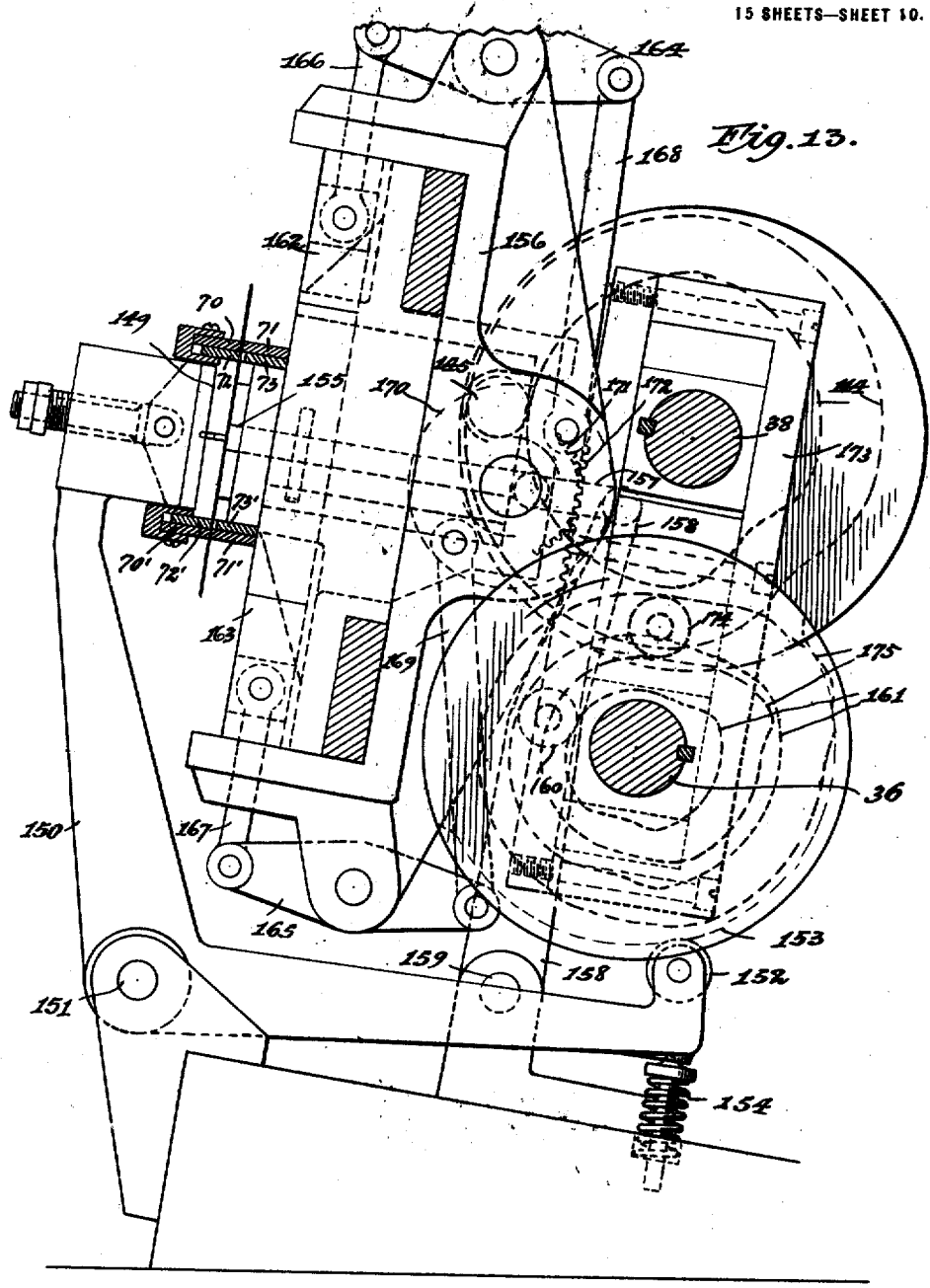

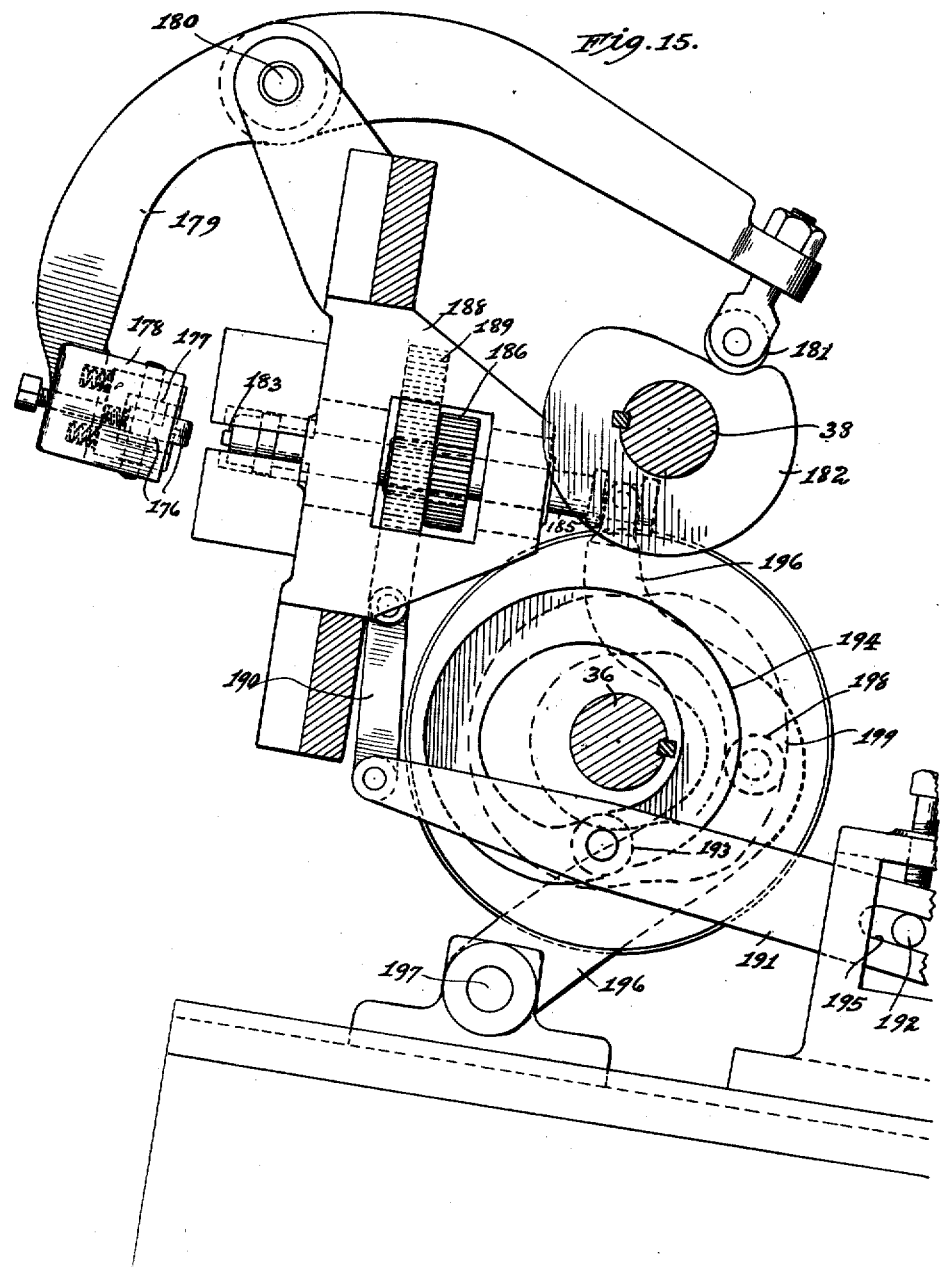

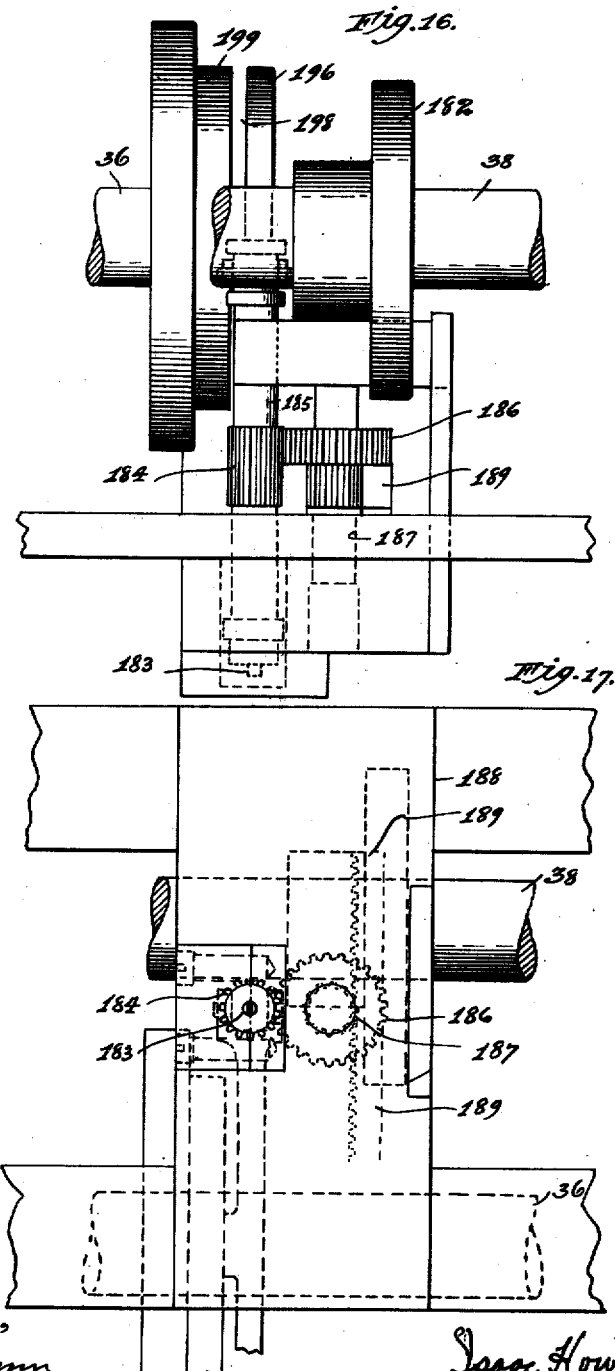

I. H. SISSON.
MACHINE FOR MAKING HAIRPINS.
APPLICATION FILED NOV. 20, 1915.
1,319,909.
Patented Oct. 28, 1919.
15 SHEETS—SHEET 13.
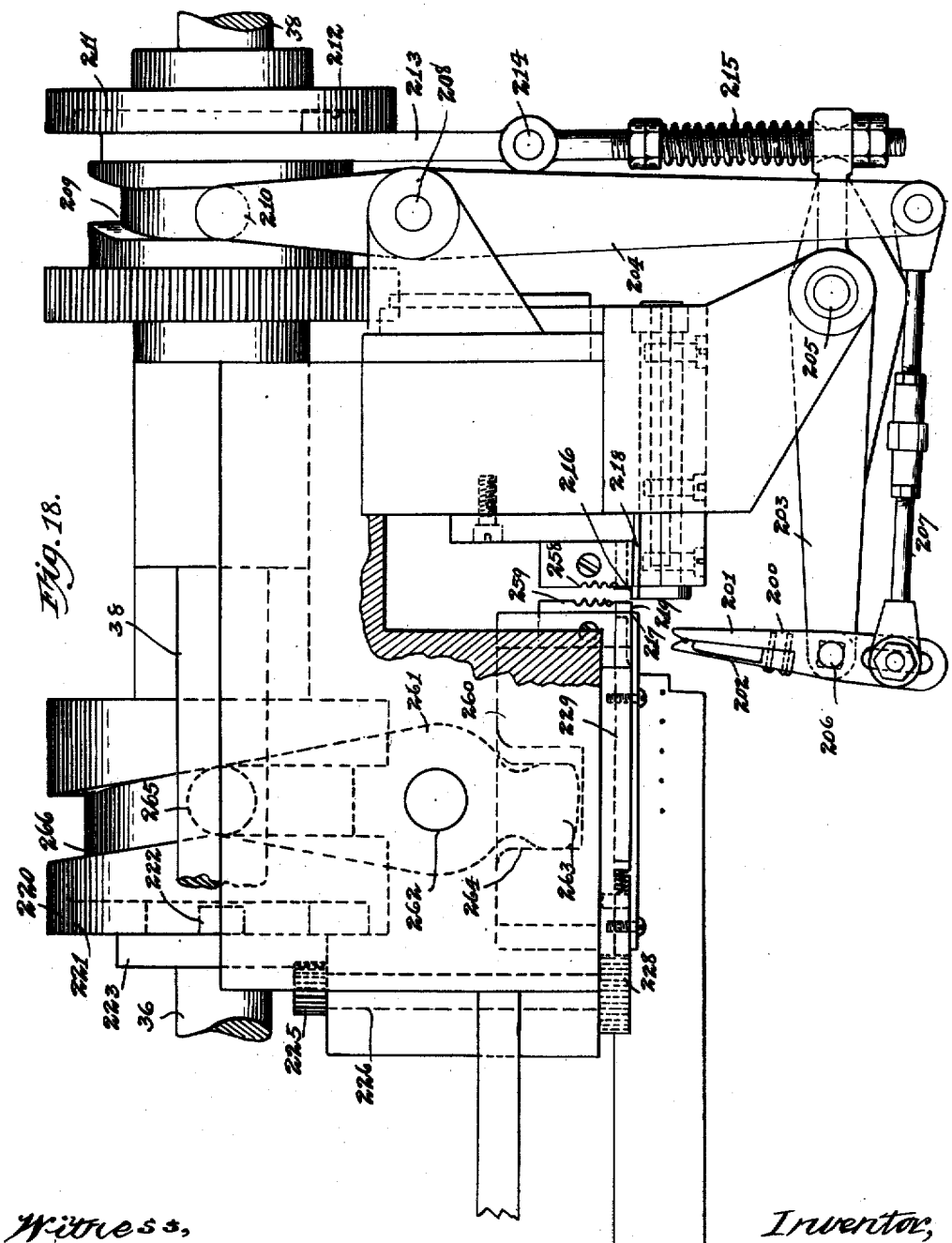

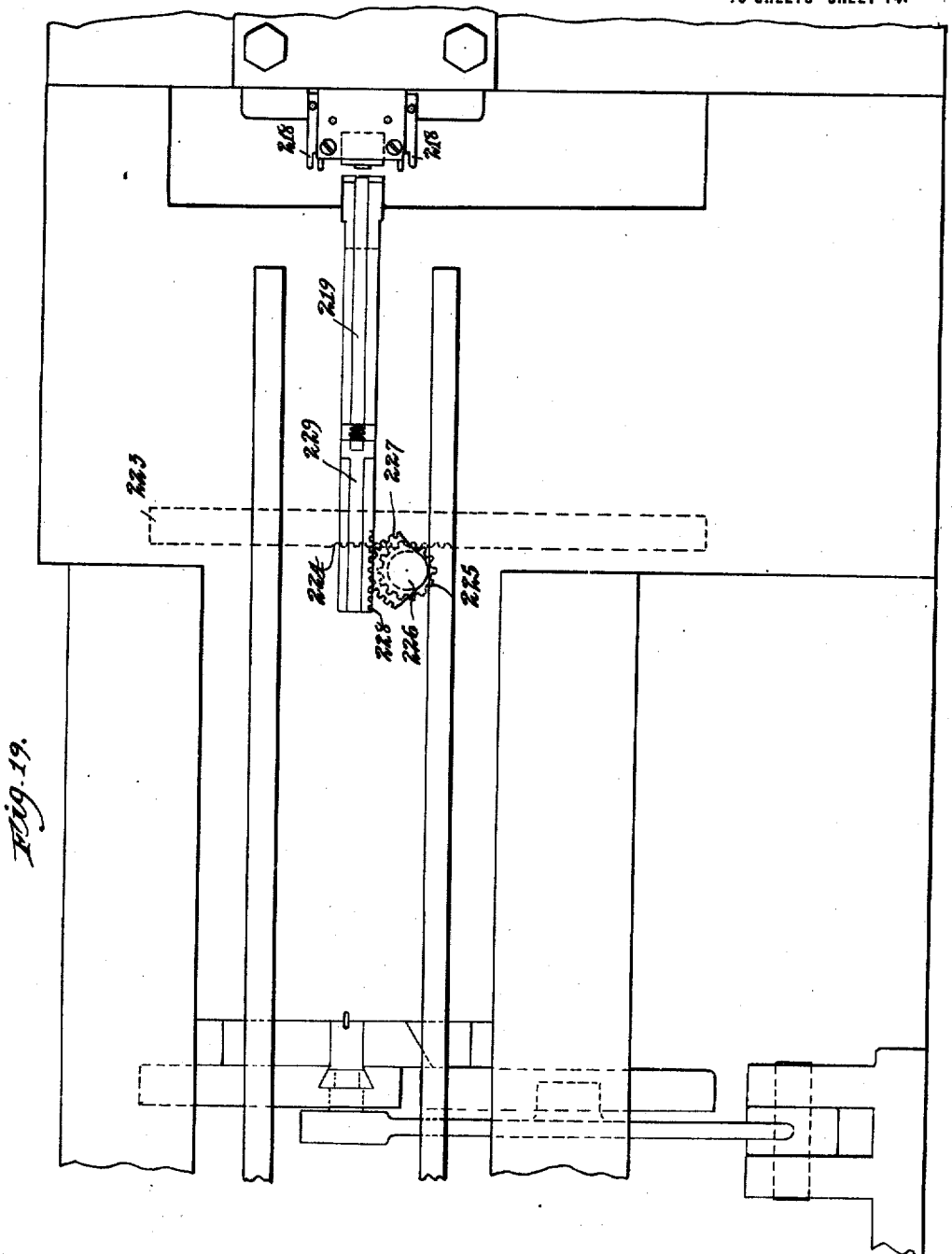

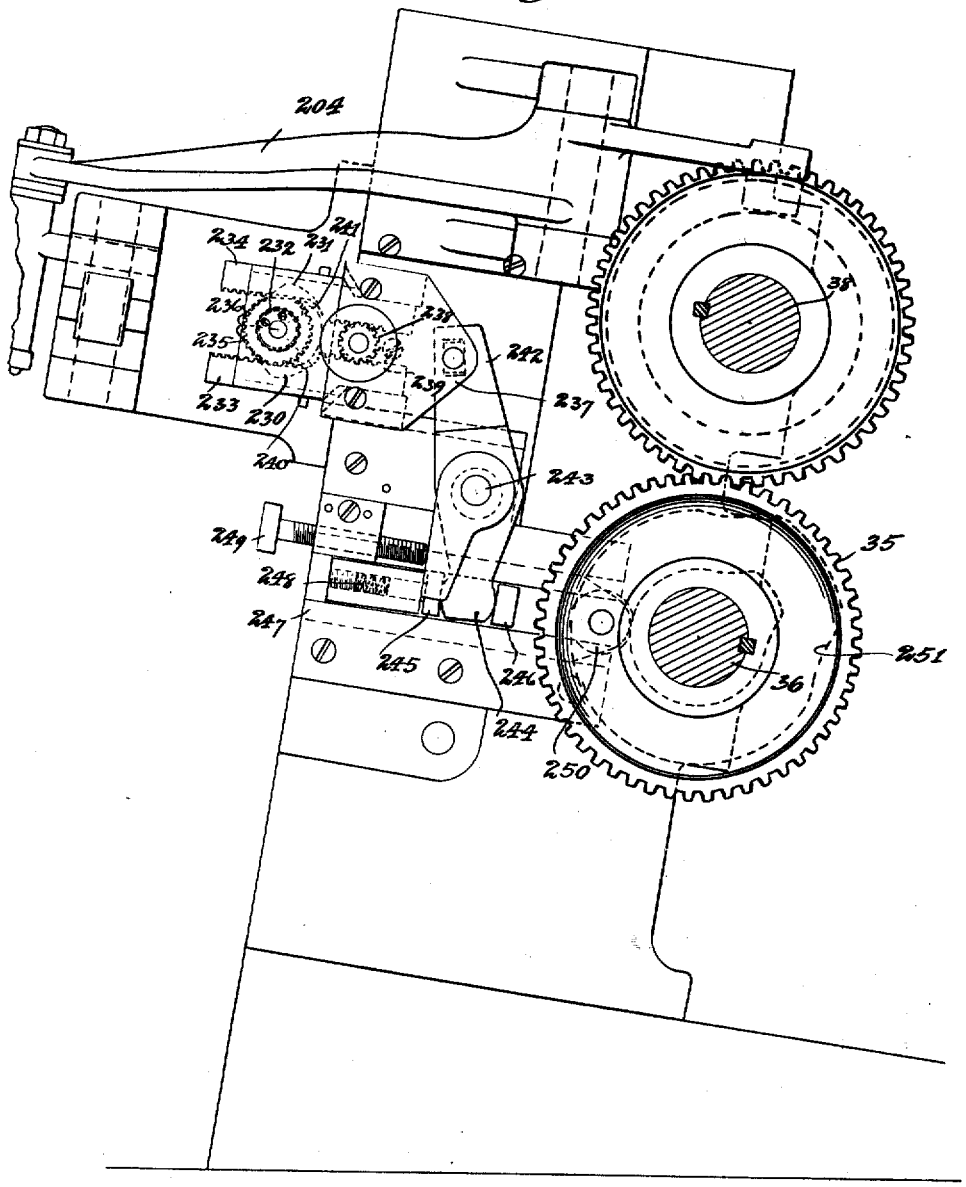

UNITED STATES PATENT OFFICE.

ISAAC HOWARD SISSON, OF PROVIDENCE, RHODE ISLAND, ASSIGNOR TO THE HUMP HAIRPIN MANUFACTURING COMPANY, OF CHICAGO, ILLINOIS, A CORPORATION OF WEST VIRGINIA.

MACHINE FOR MAKING HAIRPINS.

1,319,909.  Specification of Letters Patent.  Patented Oct. 28, 1919.

Application filed November 20, 1915. Serial No. 62,453.

*To all whom it may concern:*

Be it known that I, ISAAC HOWARD SISSON, a citizen of the United States, and a resident of the city of Providence, in the county of Providence and State of Rhode Island, have invented certain new and useful Improvements in Machines for Making Hairpins, of which the following is a specification.

This invention relates to a machine for manufacturing metallic articles such as hairpins and more particularly to an improved mechanism adapted for forming three-legged hairpins or other articles of predetermined configuration from a continuous roll of wire.

The salient objects of the invention are to provide a machine by which the hairpins or like articles can be automatically and very rapidly formed from a continuous roll of wire; to provide a construction in which a plurality of pins are operated upon simultaneously but while the various pins are in different stages of advancement toward completion; to provide a construction in which each operation on the pin is performed by a separate and distinct mechanism so that all the various operations on the pin can be performed at the same time upon different pins; to provide a construction in which a complete pin is formed for each general movement of the machine, the speed of the machine being limited solely by the time it takes to perform any one of the individual operations, thus allowing increased output over machines in which the pin or other articles is operated on twice in the same holding mechanism; to provide means for automatically straightening and severing the wire into desired lengths and rounding or polishing the opposite ends of the severed length; to provide a construction in which the severed length is automatically centered with relation to the forming mechanism so that in the completed product the opposite legs of the pin are always of equal length; to provide a machine which is capable of operating upon wires of different gage and of producing hairpins of different sizes by simple adjustment of the mechanism; to provide a construction in which all the operations are positively driven in timed relation; to provide a wire straightening means which must be started and stopped in advance of the starting and stopping of the forming mechanism, thus insuring the severed lengths being always properly straightened; to provide a construction in which the various mechanisms are controlled by a single lever; and to provide a complete machine which will occupy a minimum of floor space.

In the drawings:

Fig. 8 is a fragmentary side elevation showing the driving mechanism for the grinding rollers.

Fig. 9 is a fragmentary vertical section view from the left of Fig. 8.

Figs. 10, 11 and 12 are detail views of the advancing mechanism.

Fig. 13 is an enlarged fragmentary section taken on the line 13—13 of Fig. 1.

Fig. 14 is an enlarged detail view of the center loop hooking member.

Fig. 15 is an enlarged fragmentary section taken on line 15—15 of Fig. 1.

Fig. 16 is a plan view looking down on the parts shown in Fig. 15.

Fig. 17 is a front elevation of parts shown in Fig. 15.

Fig. 18 is an enlarged top plan view of the transfer device.

Fig. 19 is a fragmentary front elevation of parts shown in Fig. 18.

Fig. 20 is a fragmentary end elevation of parts shown in Fig. 18.

Figs. 21, 22, 23, 24 and 25 are views of the hairpin in various stages of operation.

Figure 1:
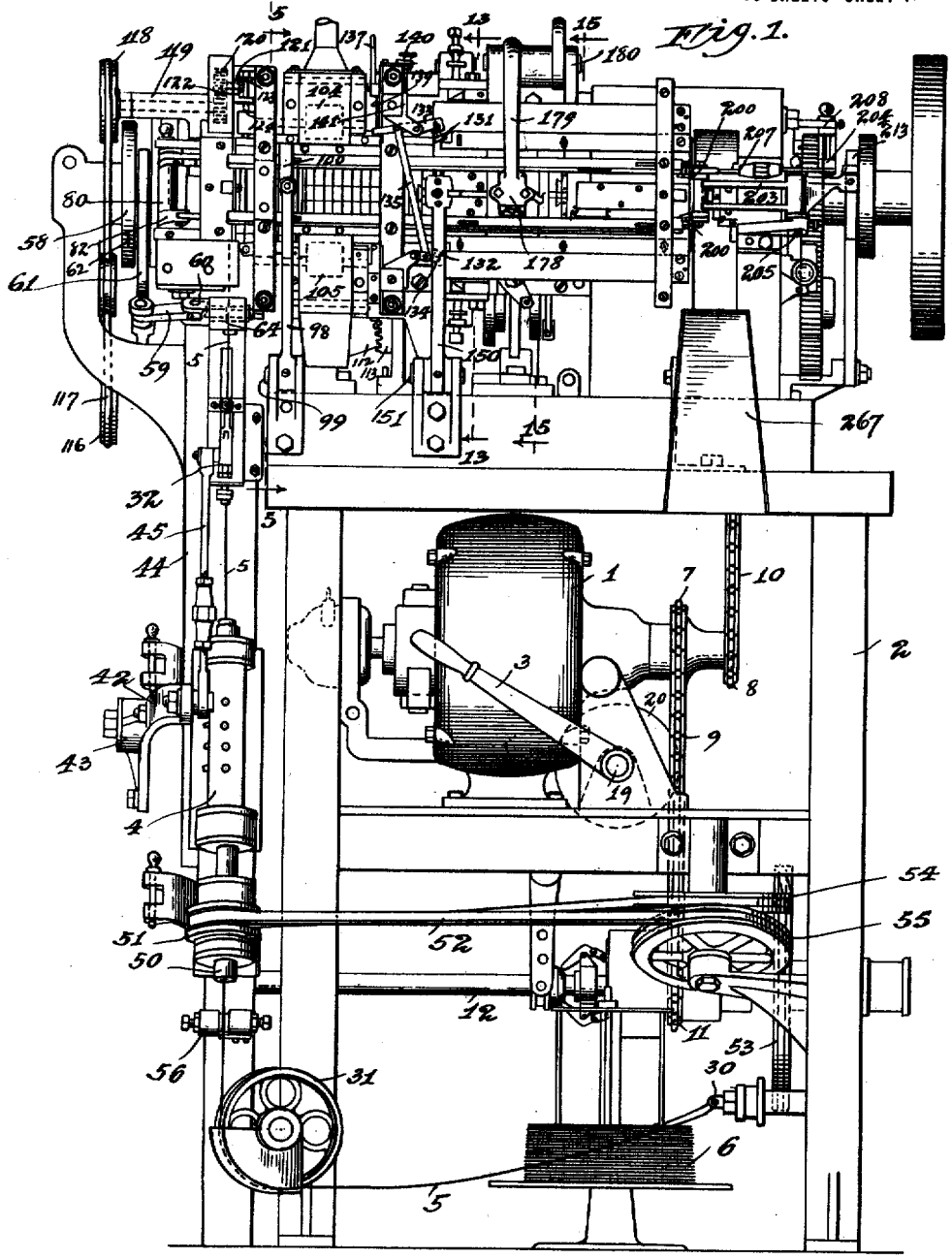
Figure 1 is a front elevation of a machine embodying my invention.

In the machine shown in the drawings, which represents one embodiment of my invention, the article produced is a three-legged hairpin of the type shown in Fig. 25, although it is, of course, understood that the invention is not limited to a machine for producing this type of pin only. Before describing the machine in detail the following summary of the various operations is stated: 1. The wire is fed from the roll. 2. It passes through a straightening device. 3. The wire is cut into predetermined lengths. 4. The severed lengths are advanced to a grinding mechanism where their ends are acted upon by rapidly revolving abrading members. 5. The ends of the wire length are engaged by equalizers which position the wire centrally of its length with reference to the forming mechanism. 6. The center portion of the wire is formed into an open loop forming the stock for the center leg. 7. The twisting mechanism is engaged with the loop thus formed. 8. The center leg is twisted. 9. It is advanced into engagement with the crowning anvil. 10. The free ends of the wire are bent over the crowning anvil into substantial parallelism with the center leg. 11. The outer legs are crimped and the center leg simultaneously humped. 12. The pin is released into the discharge chute.

All of the above operations are performed by mechanisms driven from a motor 1, which is mounted on a frame 2 which supports the entire mechanism. The connection between the motor shaft and the various mechanisms is controlled by a single operating lever 3 so connected to the wire straightener that the latter is connected into driving engagement with the motor shaft upon the initial movement of the lever 3 toward the right while the remaining mechanisms are not connected into driving engagement with the motor shaft until a later or continued movement of the lever 3 in the same direction. Conversely, when it is desired to stop the machine all of the other mechanisms are automatically stopped in advance of the wire straightening device 4, thereby insuring the wire 5 which is fed from the coil 6 being straightened and avoiding any possibility of the mechanism being clogged up by incompletely straightened wire.

Figure 2:
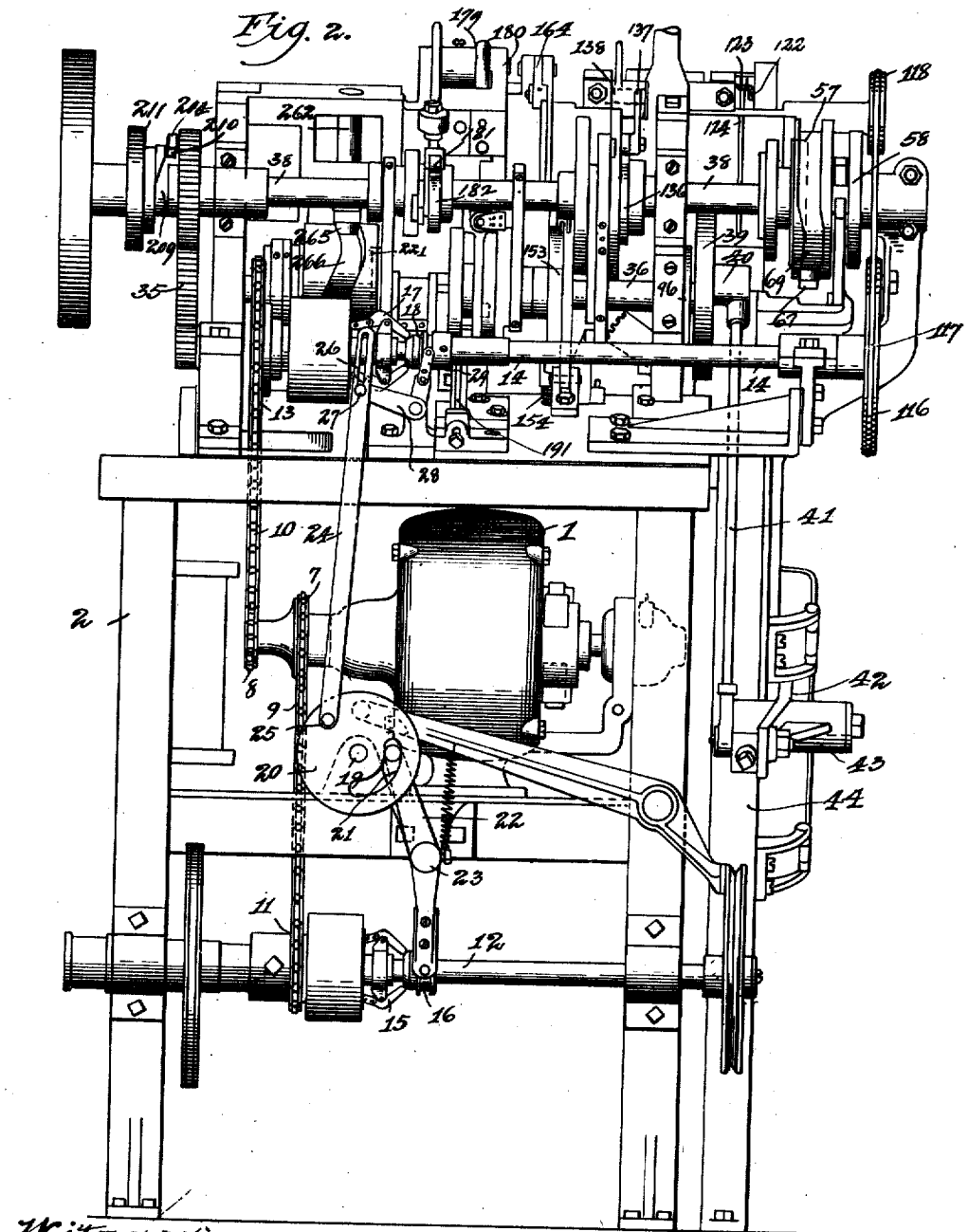
Fig. 2 is a rear elevation thereof.
Figure 3:
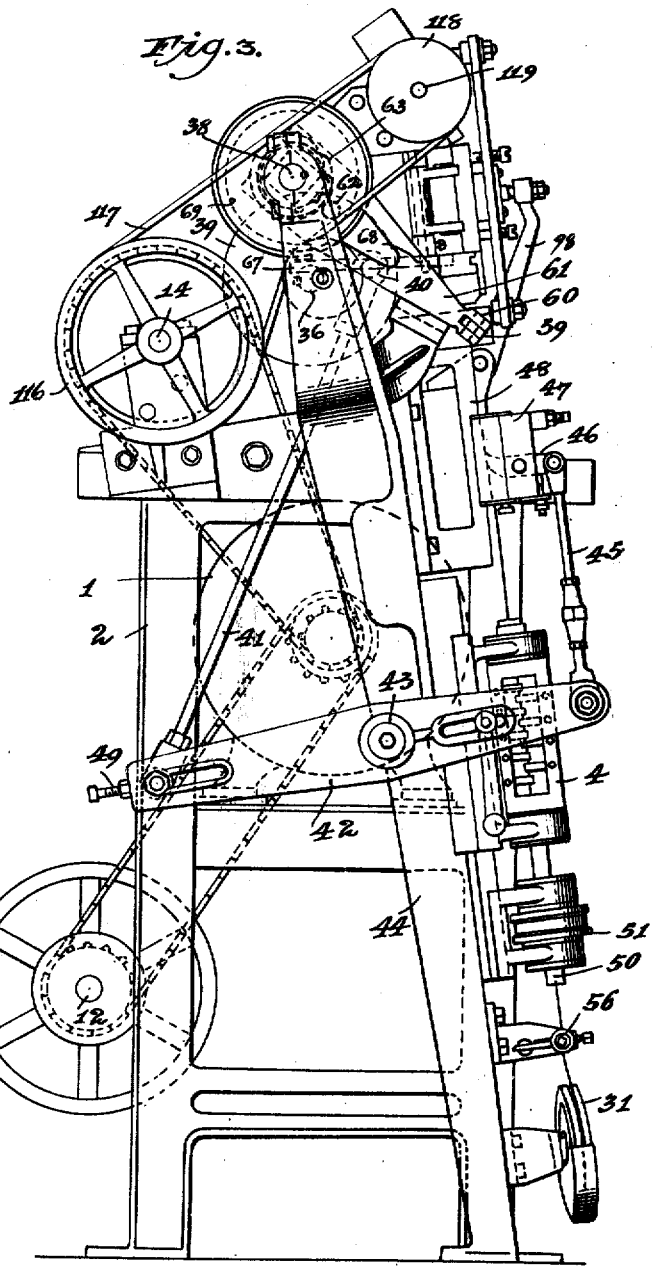
Fig. 3 is an end elevation of the end shown at the left in Fig. 1.
Figure 4:
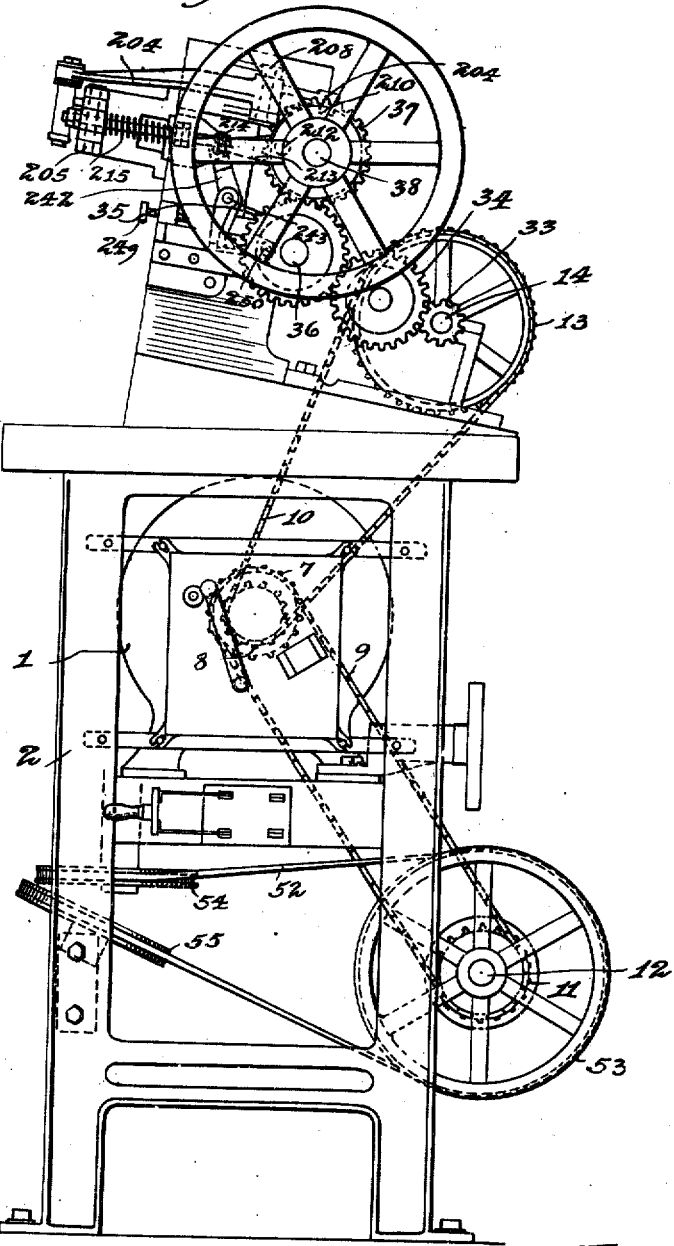
Fig. 4 is an end elevation of the end shown at the right in Fig. 1.
Figure 5:
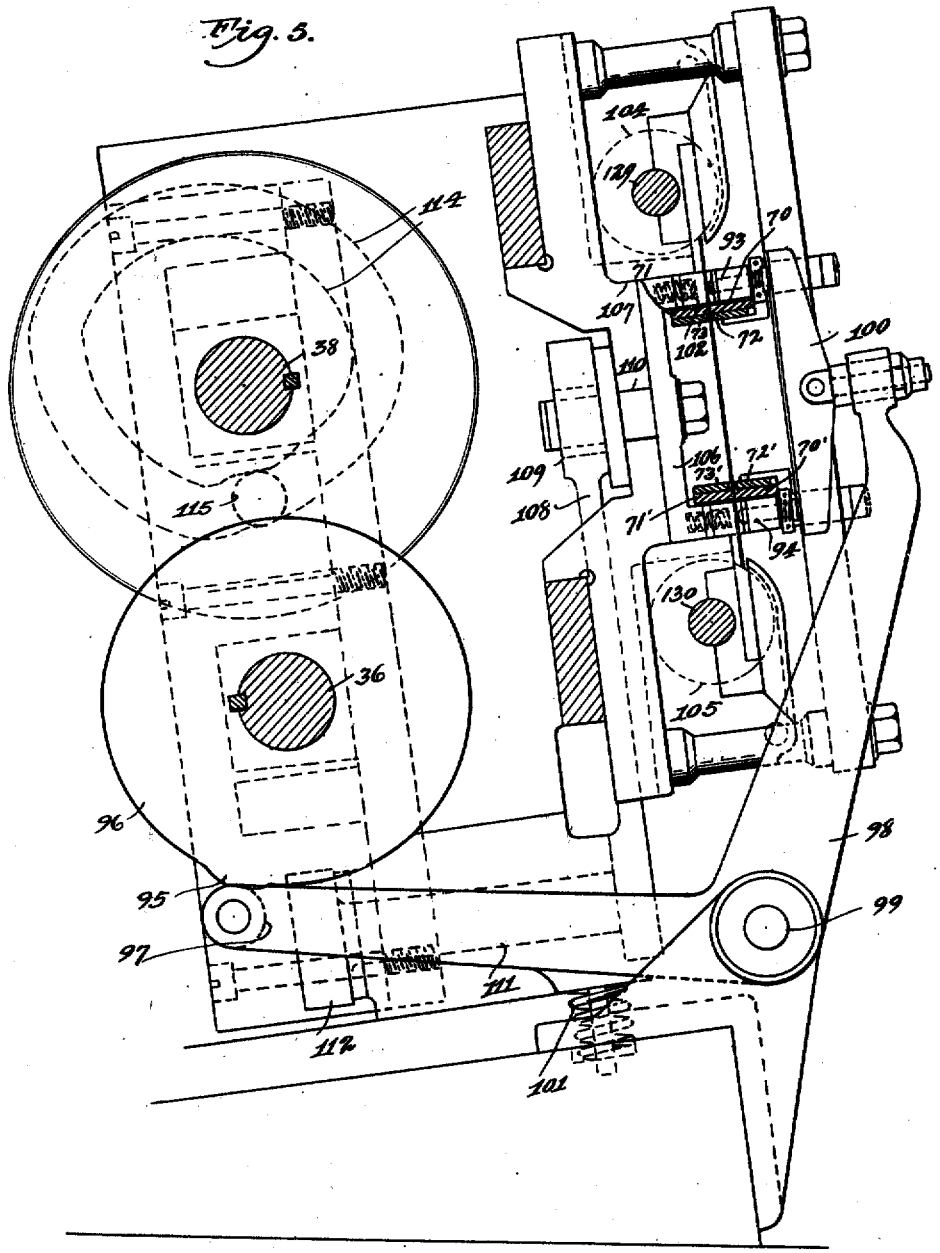
Fig. 5 is an enlarged detail view taken substantially on the line 5—5 of Fig. 1.
Figure 6:
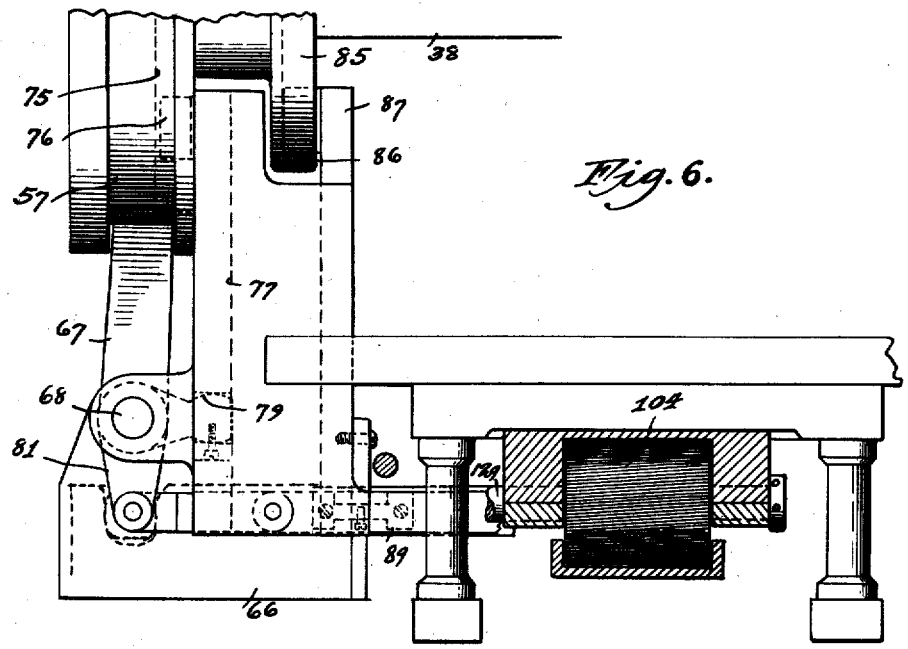
Fig. 6 is a fragmentary enlarged horizontal section through the grinding mechanism.

The detailed construction of the arrangement for starting the wire straightener in advance of the forming mechanism is as follows: Fixed to the shaft of the motor 1 is a pair of sprocket wheels 7 and 8 around which extend the sprocket chains 9 and 10. The former passes over a sprocket wheel 11 loosely mounted on a shaft 12 while the sprocket chain 10 passes over a sprocket wheel 13 loosely mounted on a shaft 14. The sprocket wheel 11 is adapted to be secured to the shaft when the clutch 15 is frictionally locked by adjusting the clutch shifter 16 toward the left in Fig. 2. The sprocket wheel 13 is adapted to be secured to the shaft 14 when the clutch 17 is frictionally locked by adjustment of the clutch shifter 18 toward the left in Fig. 2. These clutch shifters are operated from the lever 3 in the following manner:

At its lower end the lever 3 is secured to a shaft 19 to which is keyed a disk 20. The latter has a slot 21 adapted upon rocking of the lever 3 to actuate the upper end of the rock-arm 22 and rock the lever about its pivot 23, thus adjusting the clutch shifter 16 toward the left. The disk 20 is connected to the clutch 18 by a rod 24, the lower end of which is secured to the disk 20 at a point 25 offset from the center of the disk, while the upper end of the rod 24 is provided with a slot 26 through which extends a pin 27. The latter is mounted on a rock-arm 28 connected to the clutch shifter 18 by means of a link 29. It will be noticed that the arm 28 will not be rocked until the disk 20 has been rotated by adjusting the lever 3 until the rod 24 is drawn downward a greater distance than the length of the slot 26, whereas the rock-arm 22 will be actuated by the initial movement of the disk and lever 3. As both the clutch shifters are actuated from the same lever it is obvious that the sprocket wheel 11 will be connected to the shaft 12 in advance of connecting the sprocket wheel 13 to the shaft 14, and since the wire straightening mechanism is driven from the shaft 12 the wire straightener will be brought into operation in advance of the forming mechanism which is driven from the shaft 14.

The twelve steps previously enumerated are each performed by mechanism described according to its sequence of operation. First, the wire feeding mechanism. As the wire 5 comes from the roll 6 it passes through an eye 30, over a pulley 31 and through the wire straightener 4 to the reciprocating wire feed 32. This feed is connected to the shaft 14 through the following mechanism. Fixedly mounted on the shaft 14 is a pinion 33 meshing with an idler gear 34 which in turn meshes with a gear 35 mounted on a cam shaft 36. The gear 35 intermeshes with a gear 37 mounted on the cam shaft 38, which is positioned at the upper end of the frame. These shafts 36 and 38 carry a plurality of cams and other actuating members for the various mechanisms. The connection between this shaft 36 and the wire feed is as follows: Mounted on the shaft 36 is a disk 39 having an offset crank-pin 40 connected by a connecting rod 41 to a rock-arm 42 which is pivoted at 43 to the supplemental frame 44. The supplemental frame 44 also carries the wire straightener 4 and a retarding device 56 which positively presses against the wire being fed so as to insure a uniform tension thereon.

On the other end of the wire straightener is a link 45 connected to a feed dog 46 which is pivoted intermediate its ends to the block 47, the latter being slidably mounted on a slideway 48. The slideway is also mounted on the supplemental frame 44 and as the rock-arm 42 forces the slide block upward the feed dog grips the wire and advances it at predetermined amounts, which amount of feed can be changed by adjusting the set-screw 49. Upon the return of the slide block the feed dog which is of the single acting type becomes inoperative and passes freely over the wire, thus for each reciprocation of the arm 42 an exact amount of wire is pulled through the wire straightener and fed to the cut off mechanism.

The wire straightener 4 is of the rotating type, the shaft 50 of which is provided with a belt wheel 51 over which extends a belt 52. The latter is driven from the drive wheel 53 mounted on the shaft 12, there being also a pair of intermediate belt wheels 54 and 55 employed to permit the belt passing over pulleys which are mounted on transversely arranged shafts. The shaft 12 which serves as a drive shaft for the wire straightener is connected to the motor by mechanism previously described.

After passing through the wire straightener the wire is advanced to the cutting mechanism, the cam 57 for actuating which is mounted on the shaft 38, while the cam wheel 58 actuates clamping mechanism which coöperates with the cutting mechanism, the purpose of this clamping mechanism being to hold the wire below the point of separation. In detail the clamping mechanism comprises an arm 59 pivoted at 60 and connected at its outer end to a yoke 61. Mounted on the yoke 61 is a roller 62 adapted to run in a groove 63 in the cam wheel 58. Once during each revolution of the cam the yoke will be reciprocated so as to rock the arm 59 about its pivot 60. The rocking of the arm 59 alternately advances and withdraws the clamping surface 64 into and out of locking contact with the wire below the point at which the wire is severed by the cutting tool 65.

The cutting tool as an entity is slidably mounted in a head 66 and is reciprocated toward and from the wire by means of a rock-arm 67 pivoted at 68 and having its free end running in a groove 69 in the cam wheel 57. The timing of the action of the cam wheels 57 and 58 is such that the wire is clamped just before being severed and then released just after the cutting operation, the severed length of wire being immediately advanced to the next stage in the manufacture of the pin by the following mechanism:

At the time of cutting the length of wire it is positioned in a slot between the pair of bars 70 and 71 and 70' and 71', the bars of each pair being spaced apart a distance slightly greater than the diameter of the wire stock so as to permit the severed length of wire passing freely therebetween. Below the bars 70 and 71 is a pair of notched bars 72 and 73 while positioned above the bars 70' and 71' is a similar pair of notched bars 72' and 73'. The bars 73 and 73' are longitudinally adjustable in a manner hereinafter described, while both sets of bars 72 and 73 and 72' and 73' are laterally adjustable. The severed length of wire is held in the groove between the bars 70 and 71 and 70' and 71' and will be advanced as follows:

The bars 70 and 70' are normally pressed outwardly by the spring 74 so that the various notches in these bars will fit over the severed length of the wire. When, however, the bars are adjusted laterally against the tension of the spring the various slots in the bars 73 and 73' will engage the severed lengths and when so engaged the bars 73 and 73' are adjusted forwardly until the slots register with the next forward slot in the bars 72 and 72'. In this position the tension of the spring is released and the bars forced back to their original position so that the slots in the bars 72 and 72' will engage the severed lengths and hold them while the bars 73 and 73' are being adjusted longitudinally back to their original position.

Inside of the cam wheel 57 is a cam groove 75 acting on a roller 76 which roller is mounted on a slide plate 77 movable in a slideway 78. The slide plate in turn rocks the arm 79 which is fixedly secured to the sleeve so as to rotate the latter about its axis and cause the arms 81 and 82 to rock with the sleeve. The last-mentioned arms are connected by links 83 and 84 to the bars 73 and 73' so that upon the rocking movement of the arms 81 and 82 the bars 73 and 73' will be reciprocated longitudinally carrying with them the respective lengths of wire which are engaged by the notches of the bars 73 and 73'. At the extreme forward movement of these bars the lengths of wire are transferred to the notches of the bars 70 and 70' by the following mechanism:

As shown in Fig. 11 the bars 70 and 70' are normally pressed outwardly by the spring 74 so that their notches engage the severed lengths. Thus before the bars 73 and 73' can be engaged with the lengths of wire to carry them forward, both sets of bars 72 and 72' and 73 and 73' must be shifted laterally just prior to starting the longitudinal adjustment. This lateral shift is produced by the action of a cam wheel 85 on the roller 86 mounted on the slide plate 87. This plate moves in a frame slideway 88 and is connected to the bars by means of a notched bridge 89 which will cause the lateral shifting of both sets of bars without interfering with the longitudinal adjustment of the bars 73 and 73'. The timing of the actions of the cam wheel 85 to the action of the cam groove 75 in the cam wheel 57 is such that the lateral shifting takes place at the extreme ends of travel of the longitudinal adjustment.

Figure 7:
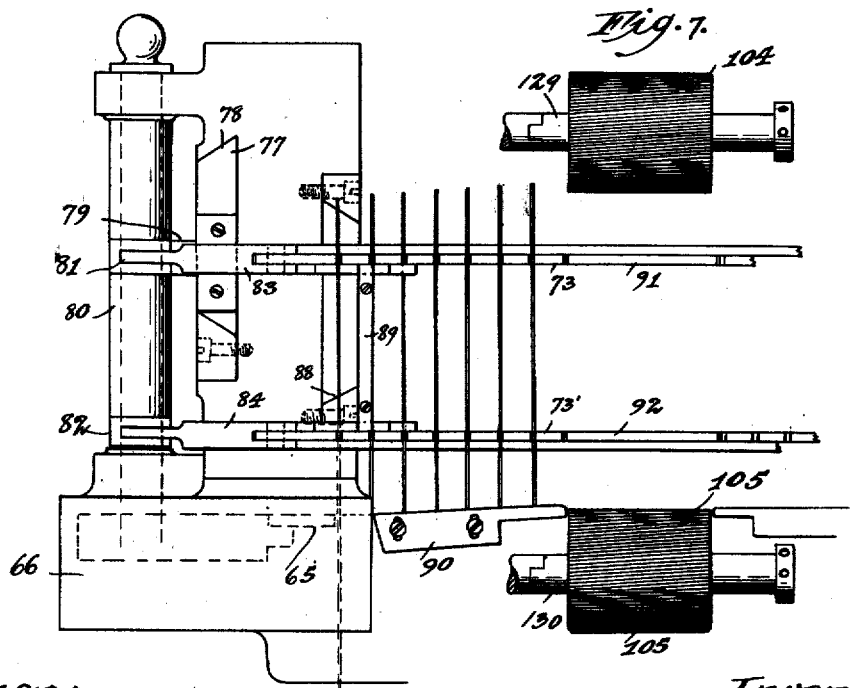
Fig. 7 is a side elevation of the parts shown in Fig. 6.

As the various lengths advance, their bottom ends rest on the inclined track member 90, and are advanced step by step as above described until they reach the plane of the grinding members. Here the bars 72 and 72′ and 73 and 73′ have no notched portions but are recessed at 91 and 92, as shown in Fig. 7. The feed for advancing the lengths across the grinding rollers comprises a friction device and a clamping mechanism for holding the released length of wire until it is in proper engagement with the friction device. The clamping mechanism consists of a pair of spring-pressed plungers 93 and 94 which are forced against the wire length when the raised portion 95 of the cam wheel 96 acts on the roller 97. This roller is mounted on one end of a bent arm or lever 98 which is pivoted intermediate its ends at 99, while the other end of the lever is pivotally connected to the shoe 100 which engages the plungers and forces them inward against the wire whenever the lever 98 is rocked about its pivot. A spring 101 is employed for yieldably holding the roller 97 in contact with the cam wheel 96.

While the length of wire is held in the above manner by the clamping mechanism, it is engaged by the reciprocating friction device 102 which presses it against the stationary plate 103 with sufficient force so that the forward movement of the friction device will cause the lengths of wire to roll forward along the stationary plate 103. This imparts a continuous rotary movement to the wire length while its ends are in engagement with the rapidly revolving grinding members 104 and 105.

Reciprocating movement is imparted to the friction device 102 as follows, there being a pair of these friction devices mounted on a slide plate 106 which moves in a slideway 107. The slide plate 106 is adjusted by means of a rock-arm 108 which has a slot 109 extending over the slide plate pin 110. At its lower end the arm 108 is secured to a rockshaft 111 to which shaft there is also secured a gear segment 112 meshing with the gear teeth in the rack-bar 113. Reciprocating movement is imparted to the rack-bar through the action of a cam 114 mounted on the main cam shaft 38, this cam acting on a roller 115 which is carried by the frame of the rack-bar 113.

The rollers 104 and 105 are driven from the shaft 14 which is provided with a belt wheel 116 connected by the belt 117 to the belt wheel 118 mounted on the stud shaft 119. Since it is desirable to rotate the rollers 104 and 105 at a much higher rate of speed than that of the shaft 119, the latter is not directly connected to the roller shaft but is provided with a change speed gearing 120. Thus a very high speed is imparted to the driven shaft 121, which through the beveled gears 122 and 123 is connected to the worm shaft 124. The latter through the worm gears 125 and 126 and 127 and 128 is connected to the shafts 129 and 130 which carry the grinding rollers 104 and 105 respectively. As each length of wire is advanced across the face of the grinding rollers its opposite ends are highly polished and given a rounded configuration owing to the combined rotary movements of the rollers and the fact that the wire is itself revolving about its axis.

As soon as the grinding operation is completed the wire length is again engaged by the notches in the bars 72 and 72′ and 73 and 73′ and fed forward as previously described. Its opposite ends are now engaged by equalizers which position it exactly centrally of its length relative to the forming mechanism so that even if there is a slight inequality in the various wire lengths the pin will still be formed with its outer legs of equal length; that is the portion bent to produce the center leg will be exactly equidistant from the ends of the wire length when the latter is in position to be acted upon by the bending tool.

As shown in Fig. 1 a pair of shoes 131 and 132 mounted on the respective arms 133 and 134 are simultaneously operated on through a connecting bar 135 which, because of its connection with the arms on the opposite sides of the pivot point thereof, causes the arm 134 to have the same movement as the arm 133 but in an opposite direction. Motion is imparted to the arms 133 and 134 to adjust the shoes 131 and 132 away from each other by means of a cam 136 mounted on the main cam shaft 38. This cam rocks an arm 137 about its pivot 138 thereby through the depression of the pin 139 against the free end of the arm 133 forcing the shoes apart. After the shoes have been moved away from each other and the wire length fed between them, the cam 136 releases the pressure on the rock shaft and permits the shoes to move against the opposite ends of the wire length and automatically center the same. For accurately adjusting the center of the pivot for the arms 133 and 134 a set-screw 140 is employed which acts on the pivot block 141 so as to raise or lower the pivot point.

The length of wire is now ready for the first bending operation, namely, the formation of the center leg. The stock for this center leg is formed by drawing back the central portion of this wire length by a hook member 142. This member is pivotally mounted in a slide block or bar 143 to which reciprocating movement is imparted by the action of the cam 144 on the roller 145 carried by the slide block. Normally the hook member is swung back on its pivot 146 so that on the forward or projecting movement of the slide block the end 148 of the hook bar will pass back of the plane of the wire length. Then before the return movement of the block the hook member is forced by the cam surface 147, to project into the plane of the wire length. Therefore, on the return of the slide block 143 the end 148 of the hook bar will engage the exact central portion of the wire length and pull it back with the slide block.

In the meantime, the frictioning member 149 is clamped against the wire length by the following mechanism, the purpose of the frictioning member being to prevent the wire from bulging, as its center portion is drawn to form the center leg stock. The frictioning member is mounted on one end of an angle-shaped arm 150 which is pivoted at 151 and has its opposite end provided with a roller positioned in the path of the cam wheel 153. Upon each revolution of this cam wheel the arm 150 will be rocked about its pivot so as to positively force the frictioning member 149 against the wire length. The roller 152 is held to the cam, and the arm and frictioning member returned to their normal inoperative position by means of a spring 154. Coöperating with the hook member 142 is an anvil member 155 slidably mounted in the stationary frame 156, this anvil member being moved into and out of operative engagement by means of a link 157 connecting it to the rock-arm 158. The latter is pivoted at its lower end on a pivot 159 and intermediate its ends is provided with a roller 160 extending into the cam groove 161 formed in the cam wheel 153. At the extreme return movement of the hook member 142 the latter is spring-pressed back to return its end 148 to normal position at one side of the wire length.

The next operation comprises the pressing together of the sides of the loop thus formed until they are in the shape shown in Fig. 22. The means for pressing together the sides of the loop comprise the anvil blocks 162 and 163 connected to rock-arms 164 and 165 by means of links 166 and 167 respectively. The opposite ends of these rock-arms are in turn connected by links 168 and 169 to an oscillatory disk 170 pivotally mounted in the frame 156. Oscillatory motion is imparted to the disk 170 by a gear segment 171 which meshes with the teeth of the rack-bar 172. The latter reciprocates with the frame 173, since the roller 174 mounted on the frame is acted upon by the groove in the cam 175, which cam is carried by the shaft 36. Thus as each loop is formed and released from the hook member its sides are pressed together and the wire length is then advanced to the twisting mechanism, the notched bars previously described being employed for advancing the wire length.

As soon as it reaches the plane of the twisting mechanism the wire length is clamped on opposite sides of the center leg by the spring-pressed jaws 176 and 177 mounted in a head 178 that is carried by the curved rock-arm 179. This arm is pivoted near its center at 180 and at its opposite end has a roller 181 extending into the path of a cam 182 mounted in the shaft 38. Just after the clamping of the wire length by the jaws 176 and 177 the center leg is telescopically engaged by the twisting member 183, this member having a combined reciprocating and rotary movement imparted to it by the mechanism shown in Fig. 15. The rotary movement is imparted through a gear 184 fixed to the shaft 185 meshing with a gear 186 mounted on the stub shaft 187, the latter projecting from the frame 188. This stub shaft is in turn driven by a reciprocating rack-bar 189 slidably mounted in the same frame and connected by a link 190 to the rock-arm 191. The latter is pivoted at 192 and provided intermediate its ends with a roller 193 running in the groove of the cam wheel 194 mounted on the shaft 36. The rock-arm 191 has a slot 195 extending over its pivot 192 and is also provided with a set-screw so that the pivot of the rock-arm can be adjusted to accurately time the movement of the rack-bar 189 and to provide for different throws of the latter.

It will be noticed that the gear 184 is relatively wide, the purpose of this arrangement being to retain the gears 184 and 186 in mesh while the former is being axially reciprocated along with its shaft 185. The reciprocating of this shaft is produced by its swivel connection with the rock-arm 196 pivoted at 197 and having a roller 198 running in the groove of a cam wheel 199. This cam wheel is mounted on the shaft 36 and thus during each revolution of the shaft the twisting member is moved up into engagement with the center leg and revolved to twist the latter and then withdrawn, after which the clamping jaws 176 and 177 are released and the wire length advanced and transferred to the bending mechanism which bends the outer legs down into substantial parallelism with the center leg.

The transfer device consists of two picker members 200, each having a pair of jaws 201 and 202, one of which is formed of spring metal so that the jaws resiliently press toward each other. The compound motion is imparted to the picker members by means of the rock-arms 203 and 204; that is, the rock-arm 203 to which the picker members are pivoted has itself a rocking movement about its pivot 205, while each picker member also has a rocking movement about its pivot 206, and is caused to rock by means of a link 207 connecting it to the rock-arm 204. The latter is rocked about its pivot 208 by the action of a cam 209 mounted on the shaft 38, which cam acts on the roller 210 carried by the rock-arm 204. The rock-arm 203 is also operated from the shaft 38, by means of a cam 211 acting on the roller 212, the roller being carried by the yoke member 213. In order to compensate for the compound movement, the latter is jointed at 214 and beyond the joint has a portion projecting through an eye in the rock-arm 203. A cushion spring 215 is adjustably held against the eye so that any desired tension can be secured for the picker members when they are forced apart to grip the wire length. After gripping the latter, the compound movement above referred to will result in transferring the wire length to the position indicated at 216, that is, between the anvil 217 and the stripper fingers 218. Just before the stripper fingers pull the wire length out of the jaws of the picker members, the anvil member 219 is forced against the wire length by the following mechanism:

Mounted on the shaft 36 is a cam wheel 220 having in one end a groove 221 acting on the roller 222. This roller is carried by a slide plate 223 which has a rack 224 meshing with the gear 225 on the shaft 226. At its opposite end the shaft 226 has a gear segment 227 meshing with the rack 228 on the slide block 229 which in turn carries the anvil member 219. The latter has a sliding movement in the block 229 and is spring-pressed forward so as to give a yieldable pressure against the wire and thus avoid the fine adjustment which would otherwise be necessary to take care of discrepancies in the gage of the wire. The anvil member 219 is held adjacent the anvil member 217 until the bending and crimping operations are completed after which it is withdrawn by the further rotation of the cam wheel 220.

The next operation is the crowning or bending operation by means of which the ends of the wire are bent down into substantial parallelism over the anvil member. As shown in Fig. 20 a pair of pivot crowning members 230 and 231 are pivoted at 232 and are rotated about the axis through the action of a pair of rack-bars 233 and 234 engaging the segments 235 and 236 which turn the respective crowning members 230 and 231. The rack-bars 233 and 234 are held in a slide plate 237 and are adjustable therein by means of their engagement with a wheel 238 which can be turned by a set-screw 239. If this set-screw is turned to the left it will withdraw the left-hand rack-bar and advance the right-hand rack-bar or vice versa, and thus an accurate adjustment can be made of the individual crowning members, so that the outside legs of the wire will be bent into equal angles with relation to the center leg. For each crowning operation the slide plate 237 is reciprocated once and on its movement to the right compels the ends 240 and 241 of the crowning members to be drawn together, thus forcing the wire length down over the crowning anvil.

The reciprocating of the slide plate 237 is caused by a rock-arm 242 which is pivoted near its center at 243 and has its free end 244 mounted between abutments 245 and 246 in a slide bar 247. The abutment 245 is spring-pressed against the end of the rock-arm by means of a spring 248 so as to cushion the crowning mechanism and to avoid the necessity of extremely fine adjustment to take care of discrepancies in the gage of the wire. Also the amount of throw of the rock-arm can be governed by the set-screw 249, thus permitting the operator to produce pins in which the outer legs are either in parallelism with the central leg or at any desired angle. At one end the slide bar 247 is provided with a roller 250 which runs in the cam groove 251 formed in the surface of the gear wheel 35.

As soon as the crowning operation is completed so that the pin is in the form shown in Fig. 24, the humping and crimping operation takes place so as to produce the crimps 252 and 253 in the outer legs 254 and 255 of the pin and the hump 256 in the center leg 257. When the outer legs of the pin have been bent down by the crowning operation just described they extend in between the stationary die plate 258 and the movable crimping and humping die 259, the latter of which is mounted in a slide plate 260. Reciprocating movement is imparted to this slide plate by means of a rock-arm 261 centrally pivoted at 262 and having its end 263 extending into a recess 264 in the slide plate 260. The opposite end of the rock-arm 261 is provided with a roller 265, which runs in a cam groove 266 provided in the outer face of the cam 220. The sides of this groove acting on the roller 265 will shift the rock-arm about its pivot and alternately advance and retract the movable crimping and humping die 259.

As soon as the die 259 reaches its inward movement toward the die plate 258 the formation of the pin is completed, and upon the return movement of the die 259 the pin being also released by the return of the anvil member 219 will fall into the discharge chute 267 and be conducted either to the japanning or packing mechanism, depending upon whether or not any further treatment of the pin is desired.

From the above detailed description it will be obvious that the hairpins are formed entirely automatically from a continuous roll of wire and that the resultant product will always be much more accurately formed than if any manual operations were required. Moreover, the arrangement of the notched bars for advancing the various lengths of pins and the distribution of the various forming mechanisms is such that a complete pin is formed for each general movement of the machine, that is, for each revolution of the cam shaft 38 a complete pin is formed and discharged and other pins advanced accordingly. In the various views, parts have been omitted so that the connection between other parts can be more clearly shown; and while I have shown and described certain mechanical movements for driving the various mechanisms it is obvious that the invention is not limited, unless so specified in the claims, to the details of construction shown.

I claim as my invention:

1. In a machine for manufacturing hairpins or the like, the combination of means for advancing a continuous strip of wire, a reciprocating cutter for severing predetermined lengths of the wire, and means for changing the configuration of the severed ends of the wire.

2. In a machine for manufacturing hairpins or the like, the combination with means for straightening the wire as it comes from the roll and means for bending the wire, of a common driving means for said means, and a connection between said driving means and said wire straightening means for starting and stopping the latter in advance of the starting and stopping of the wire bending means.

3. In a machine for manufacturing hairpins or the like, the combination with a wire straightener and a wire forming mechanism, of a single control lever for said wire straightener and forming mechanism adapted when adjusted in one direction to first start the wire straightener and upon continued movement to start the wire forming mechanism.

4. In a machine for manufacturing hairpins or the like, the combination of means for advancing a continuous strip of wire, a reciprocating cutter for severing predetermined lengths of the wire, a holder for receiving a plurality of the severed lengths, means for performing a plurality of operations on each severed length while in the holder, and means for successively advancing the severed lengths in said holder.

5. In a machine for manufacturing hairpins or the like, the combination with mechanisms for performing two operations on a wire, of a single control mechanism therefor, adapted on initial movement to first start one of said mechanisms and on continued movement to start the other.

6. In a machine for manufacturing hairpins, the combination with means for advancing a continuous strip of wire, of means for severing the same into lengths, means for simultaneously and sequentially performing operations of different lengths on the severed wire lengths, means for discharging the completed pin, and controlling mechanism regulating said discharge during the interval of operation of the shortest lengths.

ISAAC HOWARD SISSON.